United States Patent [19]
Richter et al.

[11] 3,917,664
[45] Nov. 4, 1975

[54] 1-HALO-2-ALKOXYIMINO-2-ALKOXY ETHANE COMPOUNDS

[75] Inventors: Sidney B. Richter, Chicago; Ephraim H. Kaplan, Skokie, both of Ill.

[73] Assignee: Velsicol Chemical Corporation, Chicago, Ill.

[22] Filed: Apr. 1, 1971

[21] Appl. No.: 130,435

Related U.S. Application Data

[63] Continuation-in-part of Ser. No. 758,569, Sept. 9, 1968, abandoned.

[52] U.S. Cl............ 260/453 R; 260/944; 71/86; 71/87; 71/98; 71/118; 424/210
[51] Int. Cl.[2]........................ C07C 119/18
[58] Field of Search.... 260/453 R, 561 HL; 71/118, 71/121; 424/298

[56] References Cited
UNITED STATES PATENTS

| | | | |
|---|---|---|---|
| 1,889,323 | 11/1932 | Schmidt et al. | 260/453 R |
| 2,569,425 | 9/1951 | Norris | 260/453 R |
| 3,187,041 | 6/1965 | Richter | 71/118 |
| 3,218,146 | 11/1965 | Weil et al. | 71/118 |
| 3,306,726 | 2/1967 | Berliner et al. | 260/453 R |
| 3,356,484 | 12/1967 | Richter | 71/121 |
| 3,472,646 | 10/1969 | Eve et al. | 71/118 |
| 3,488,355 | 1/1970 | Levy | 260/453 R |

*Primary Examiner*—Glennon H. Hollrah
*Attorney, Agent, or Firm*—Robert J. Schwarz; Dietmar H. Olesch

[57] ABSTRACT

This invention discloses new compounds of the formula

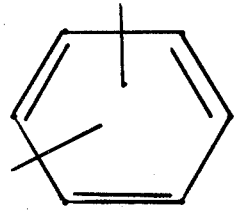

wherein X is halogen; $R^1$ and $R^2$ are alkyl; and Q is selected from the group consisting of hydrogen, alkyl, alkenyl, alkoxy, alkylthio and wherein Z is selected from the group consisting of alkyl, alkoxy, halogen and nitro; *m* is an integer from 0 to 3; A is methylene; and *n* is an integer from 0 to 1. These compounds are useful as intermediates for preparing a variety of valuable pesticidal compounds.

6 Claims, No Drawings

1-HALO-2-ALKOXYIMINO-2-ALKOXY ETHANE COMPOUNDS

This application is a continuation-in-part of our copending application, Ser. No. 758,569 filed Sept. 9, 1968 now abandoned.

This invention relates to new compositions of matter and more particularly relates to new chemical compounds of the formula

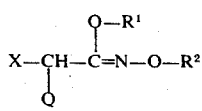

wherein X is halogen; $R^1$ and $R^2$ are alkyl; and Q is selected from the group consisting of hydrogen, alkyl, alkenyl, alkoxy, alkylthio and

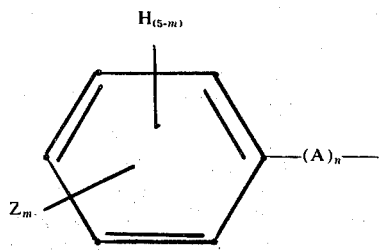

wherein Z is selected from the group consisting of alkyl, alkoxy, halogen and nitro, $m$ is an integer from 0 to 3; A is methylene; and $n$ is an integer from 0 to 1.

In a preferred embodiment of this invention X is selected from the group consisting of chlorine and bromine; $R^1$ and $R^2$ are alkyl of up to 10 carbon atoms; and Q is selected from the group consisting of hydrogen, lower alkyl, lower alkenyl, lower alkoxy, lower alkylthio and

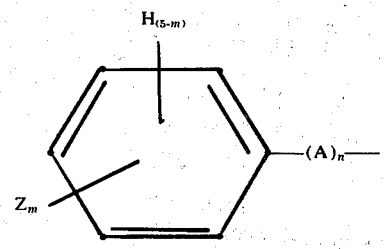

wherein Z is selected from the group consisting of lower alkyl, lower alkoxy, chlorine, bromine and nitro; $m$ is an integer from 0 to 3; A is methylene and $n$ is an integer from 0 to 1.

The compounds of the present invention are useful as intermediates for preparing a variety of valuable pesticidal compounds particularly insecticides and acaricides.

The compounds of the present invention can be readily prepared from compounds of the formula

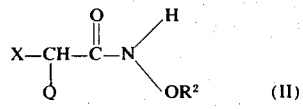

wherein X, Q and $R^2$ are as heretofore described, by reaction with a diazoalkane. This reaction can be effected by slowly adding a solution of the compound of Formula II, with stirring, to a molar excess of a solution of the diazoalkane at a temperature below about 15° C and preferably at a temperature of from about −10° to about 10° C. Suitable solvents for the reactants are inert organic solvents such as ether, benzene or ether-ethanol mixtures or the like. After the addition is completed, stirring can be continued for a short period to insure completion of the reaction. The desired product can be recovered by evaporation of the solvents used and can then be used as such or can be further purified by conventional techniques well known in the art.

Exemplary diazoalkanes suitable for reaction with the compounds of Formula II are diazomethane, diazoethane, diazo-n-propane, diazoisobutane, diazo-n-butane, diazo-n-pentane, diazo-n-hexane, diazo-n-octane, and the like.

Exemplary compounds of Formula II which are suitable for preparing the compounds of this invention are:
N-methoxy-α-chloroacetamide
N-methoxy-α-bromoacetamide
N-ethoxy-α-chloroacetamide
N-ethoxy-α-bromoacetamide
N-n-propoxy-α-chloroacetamide
N-isopropoxy-α-chloroacetamide
N-n-butoxy-α-chloroacetamide
N-n-nonoxy-α-chloroacetamide
N-methoxy-α-chloropropionamide
N-methoxy-α-chloro-n-butyramide
N-ethoxy-α-chloroisobutyramide
N-methoxy-α-chloro-n-valeramide
N-isopropoxy-α-chloro-n-caproamide
N-methoxy-α-phenyl-α-chloroacetamide
N-methoxy-α-(4-chlorophenyl)-α-chloroacetamide
N-methoxy-α-(2-methylphenyl)-α-chloroacetamide
N-methoxy-α-(3-nitrophenyl)-α-chloroacetamide
N-ethoxy-α-(3-dimethylaminophenyl)-α-chloroacetamide
N-methoxy-α-(2,6-dimethoxy-4-chlorophenyl)-α-chloroacetamide
N-methoxy-α-benzyl-α-chloroacetamide
N-pentoxy-α-(3-chlorobenzyl)-α-chloroacetamide
N-ethoxy-α-(2-methoxyphenyl)-α-chloroacetamide The compounds of Formula II can be conveniently obtained by reacting an alkoxyamine hydrochloride of the formula

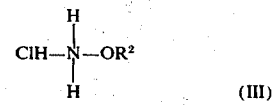

and an acid chloride of the formula

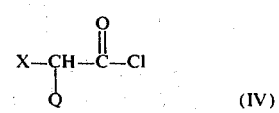

wherein X, Q and $R^2$ are as heretofore described.

The acid chloride of Formula IV can be prepared from the corresponding acid by refluxing the acid with thionyl chloride in the conventional manner.

The foregoing described preparation of the compounds of Formula II can be performed in a suitable inert organic solvent, e.g. methylene chloride at low temperatures, normally below 0° C. This reaction is performed in the presence of an acid scavenger in a molar amount twice that of the compound of Formula III. The following examples illustrate the preparation of the compounds of Formula II.

EXAMPLE 1

Preparation of N-methoxy-2-chloropropionamide

In a 1 liter 3-necked round-bottomed flask equipped with a calcium chloride drying tube, thermometer, stirrer and additional funnel were placed methoxyamine hydrochloride (33.4 grams; 0.40 mole) and methylene chloride (225 ml.). The mixture was cooled to −20° in a dry ice acetone bath. Triethylamine (80.8 grams; 0.80 mole) was added dropwise over a period of 30 minutes with stirring. Stirring was continued at −20° for an additional 60 minutes. Then 2-chloropropionyl chloride (50 grams; 0.39 mole) in methylene chloride (60 ml.) was slowly added dropwise with stirring at −10° to −20°.C. Stirring at these temperatures was continued for 2 hours. The mixture was allowed to warm to room temperature and stirred overnight. The triethylamine hydrochloride was filtered. Ether (150 ml) was added to the filtrate to precipitate additional triethylamine hydrochloride. The salt was filtered and washed with ether. The combined filtrate was distilled on a rotary evaporator to give a pale green liquid which was distilled in vacuo to give the captioned product (41.5 grams boiling point 62° at 0.15 mm Hg).

EXAMPLE 2

Preparation of N-methoxy chloroacetamide

In a 2 liter, three-necked round-bottomed flask equipped with thermometer, addition funnel, stirrer and calcium chloride drying tube was added methylene chloride (700 ml) and methoxyamine hydrochloride (70.0 grams). The mixture was cooled to −20° to −30° C. Triethylamine (169.7 grams; 1.68 moles) was added dropwise with stirring. After the addition was complete, the mixture was stirred for one additional hour. The temperature was maintained at −20° to −30° C. Then chloroacetyl chloride (94.8 grams; 0.89 mole) in methylene chloride was added dropwise over one hour. After the addition was complete, the mixture was stirred for an additional hour at −20° C to −30° C. It was warmed to room temperature and stirred overnight. The triethylamine hydrochloride was removed by filtration and the filtrate distilled in a rotary evaporator to remove solvent and unreacted reagents. The residue was taken up in benzene. Ether was added to precipitate additional triethylamine hydrochloride. The salt was filtered off and the filtrate distilled in vacuo giving the captioned product (81.5 grams) which was purified by distillation. The product (72.9 grams) distilled at 65°–66° C at 0.10 mm Hg.

EXAMPLE 3

Preparation of N-methoxy-2-chloro-2-phenylacetamide

Methoxyamine hydrochloride (22.0 grams; 0.26 mole) was suspended in methylene chloride (100 ml) and cooled with stirring in acetone dry ice to −30°. Triethylamine (56 grams; 0.56 mole) was added dropwise with stirring while keeping the temperature below −30°. α-Chlorophenylacetyl chloride (50 grams; 80.26 mole) in methylene chloride (100 ml) was added dropwise over a period of 1 hour with stirring at a temperature below −30° C. The mixture was then stirred for 2 hours below −20° and for an additional 2 hours while it warmed to room temperature. The mixture was then stirred at room temperature overnight. The triethylamine hydrochloride was filtered with suction. The filtrate was distilled in vacuo and the residue taken up with methylene chloride and ether to precipitate additional triethylamine hydrochloride. The salt was filtered and the filtrate distilled in vacuo to give an oil which could not be solidified. This oil was chromatographed on Florex using methylene chloride. The captioned product was obtained by addition of cyclohexane to the methylene chloride solution followed with cooling. The precipitated product after being filtered and air dried had a melting point of 103° – 105° C.

The manner in which the compounds of the present invention can be prepared readily is illustrated in the following examples.

EXAMPLE 4

Preparation of 1-Chloro-2-methoxyimino-2-methoxyethane

Ether (275 ml) was added to a 40% aqueous solution of potassium hydroxide (85 ml) contained in a 500 ml Erlenmeyer flask and the resulting mixture was cooled in an ice-salt bath to −5° C with stirring in the absence of light. N-Nitrosomethylurea (30 grams; 0.29 mol) was added over a period of about 3 minutes with stirring and continued cooling. The ether phase was then decanted into a cooled 1 liter flask and a solution of N-methoxy-α-chloroacetamide (20 grams; 0.16 mol) in ether and ethyl alcohol was slowly added, with stirring and cooling, over a period of about 2 hours. Stirring and cooling was continued for about 4 hours after the addition was completed. The reaction mixutre was then allowed to warm up to room temperature and was dried over anhydrous magnesium sulfate. The mixture was filtered and the filtrate was stripped of solvents. The residue was distilled and the fraction boiling between 61° and 70°C at 20 mm Hg pressure was collected to yield 1-chloro-2-methoxyimino-2-methoxyethane.

EXAMPLE 5

Preparation of 1-Chloro-2-methoxyimino-2-ethoxyethane

Ether (275 ml) was added to a 40% aqueous solution of potassium hydroxide (85 ml) and the resulting mixture was stirred and cooled to about −5°C in the absence of light. N-Nitrosoethylurea (35.5 grams; 0.29 mol) was slowly added over a period of about 10 minutes with stirrig and contiued cooling. The ether phase was then decanted into a precooled 1 liter flask and a solution of N-methoxy-α-chloroacetamide (20 grams; 0.16 mol) in an ethanol-ether mixture (200 ml) was slowly added over a period of about 95 minutes. Stirring and cooling was continued for a period of about 1 hour after the addition was completed. After this time the reaction mixture was allowed to warm up to room temperature and was dried over anhydrous magnesium sulfate. The dried solution was filtered and then stripped of solvents. The residue was distilled in vacuo to yield 1-chloro-2-methoxyimino-2-ethoxyethane having a boiling point of 53°C at 18 mm Hg pressure and having the following elemental analysis as calculated for $C_5H_{10}ClNO_2$:

|   | C | H | Cl |
|---|---|---|---|
| Theoretical % | 39.6 | 6.6 | 23.4 |
| Found % | 39.44 | 6.62 | 23.44 |

EXAMPLE 6

Preparation of
1-Chloro-2-n-butoxyimino-2-ethoxyethane

A freshly prepared solution of diazoethane (12 grams; 0.2 mol) in ether (200 ml) is charged into a liter glass reaction flask equipped with a magnetic stirrer and is cooled to a temperature of about 5°C. A solution of N-n-butoxy-α-chloroacetamide (17 grams; 0.1 mol) in a 1:1 mixture of ethanol and ether (200 ml) is then slowly added to the flask, with continuous stirring and cooling, over a period of about 1 hour. After the addition is completed, stirring is continued for about 2 hours. After this time the mixture is filtered and the filtrate is stripped of solvents under reduced pressure to yield 1-chloro-2-n-butoxyimino-2-ethoxyethane as a residue.

EXAMPLE 7

Preparation of
1-Chloro-2-isopropxylmino-2-methoxyethane

A freshly prepared solution of diazomethane (8.4 grams; 0.2 mol) in ether (200 ml) is placed into a 1 liter glass reaction vessel equipped with a magnetic stirrer and is cooled to a temperature of about 0°C. A solution of N-isopropoxy-α-chloroacetamide (15.2 grams; 0.1 mol) in a 1:1 mixture of ethanol and ether (200 ml) is then added to the reaction vessel, with continuous stirring and cooling, over a period of about 2 hours. Stirring is continued for a further period of about 3 hours after the addition is completed. After this time the mixture is filtered and the filtrate is stripped of solvents under reduced pressure to yield 1-chloro-2-isopropoxyimino-2-methoxyethane as a residue.

EXAMPLE 8

Preparation of
1-Chloro-1-phenyl-2-methoxyimino-2-methoxyethane

A newly prepared solution of diazomethane (8.4 grams; 0.2 mol) in ether (200 ml) is placed into a 1 liter glass reaction flask equipped with a magnetic stirrer, and is cooled to a temperature of about 5°C. A solution of N-methoxy-α-phenyl-α-chloroacetamide (11 grams; 0.1 mol) in ether (150 ml) is then added to the reaction flask, with continuous stirring and cooling over a period of about 1 hour. After the addition is completed, stirring is continued for a period of about 2 hours. After this time the reaction mixture is stripped of solvent under reduced pressure to yield 1-chloro-1-phenyl-2-methoxyimino-2-methoxyethane.

EXAMPLE 9

Preparation of
1-Chloro-1-(4-chlorophenyl)-2-methoxyimino-2-ethoxyethane

A newly prepared solution of diazoethane (12 grams; 0.2 mol) is placed into a 1 liter glass reaction flask equipped with a magnetic stirrer, and is cooled to a temperature of about 0°C. A solution of N-methoxy-α-(4-chlorophenyl)-α-chloroacetamide (14.5 grams; 0.1 mol) in ether (150 ml) is then added to the reaction flask, with continuous stirring and cooling, over a period of about 2 hours. After the addition is completed, stirring is continued for about 2 hours. After this time the reaction mixture is stripped of solvent under reduced pressure to yield 1-chloro-1-(4-chlorophenyl)-2-methoxyimino-2-ethoxyethane.

Othher compounds within the scope of this invention can be prepared by the procedures described in the foregoing examples. Presented in the following examples are the essential ingredients required to prepare the indicated named compounds according to the procedures heretofore described.

EXAMPLE 10

N-Ethoxy-α-chloroacetamide + diazoethane = 1-chloro-2-ethoxyimino-2-ethoxyethane.

EXAMPLE 11

N-Methoxy-α-chloroacetamide + diazo-n-propane = 1-chloro-2-methoxyimino-2-n-propoxyethane.

EXAMPLE 12

N-Decoxy-α-chloroacetamide + diazomethane = 1-chloro-2-decoxyimino-2-methoxyethane.

EXAMPLE 13

N-Methoxy-α-(3-methylphenyl)-α-chloroacetamide + diazoethane = 1-chloro-1-(3-methylphenyl)-2-methoxyimino-2-ethoxyethane.

EXAMPLE 14

N-Methoxy-α-(3-nitrophenyl)-α-chloroacetamide + diazomethane = 1-chloro-1-(3-nitrophenyl)-2-methoxyimino-2-methoxyethane.

EXAMPLE 15

N-Methoxy-α-(2-methoxyphenyl)-α-chloroacetamide + diazomethane = 1-chloro-1-(2-methoxyphenyl)-2-methoxyimino-2-methoxyethane.

EXAMPLE 16

N-Methoxy-α-(3-dimethylaminophenyl)-α-chloroacetamide + diazomethane = 1-chloro-1-(3-dimethylaminophenyl)-2-methoxyimino-2-methoxyethane.

EXAMPLE 17

N-Methoxy-α-benzyl-α-chloroacetamide + diazomethane = 1-chloro-1-benzyl-2-methoxyimino-2-methoxyethane.

EXAMPLE 18

N-Methoxy-α-chloropropionamide + diazo-n-butane = 1-methoxyimino-1-n-butoxy-2-chloropropane.

EXAMPLE 19

N-Methoxy-α-chlorocaprylamide + diazo-n-octane = 1-methoxyimino-1-n-octyloxy-2-chlorooctane.

Additional compounds with the scope of the present invention which can be prepared by procedures similar to those heretofore described, but which are not intended to limit this invention thereto, are:

1-chloro-1-allyl-2-methoxyimino-2-methoxyethane
1-chloro-1-methoxy-2-ethoxyimino-2-methoxyethane
1-chloro-1-isopropoxy-2-methoxyimino-2-methoxyethane 1-chloro-1-ethylthio-2-isopropoxyimino-2-methoxyethane 1-chloro-1-n-pentylthio-2-methoxyimino-2-methoxyethane 1-chloro-1-n-decyloxy-2-methoxyimino-2-pentyloxyethane 1-chloro-1-allyloxy-2-methoxyimino-2-methoxyethane 1-chloro-1-phenoxy-2-methoxyimino-2-methoxyethane 1-chloro-1-phenethyl-2-methoxyimino-2-methoxyethane 1-chloro-1-phenylthio-2-ethoxyimino-2-ethoxyethane 1-chloro-(2-isopropyl-4-bromophenyl)-2-methoxyimino-2-methoxyethane 1-chloro-1-(3-methylthio-5-allylphenyl)-2-methoxyimino-2-n-butoxyethane 1-chloro-1-(2-dimethylamino-4-ethoxyphenyl)-2-methoxyimino-2-methoxyethane 1-chloro-1-(3-di-n-propylamino-5-iodophenyl)-2-methoxyimino-2-methoxyethane 1-chloro-1-(2,4-dinitro-5-chlorophenyl)-2-methoxyimino-2-n-butoxyethane 1-chloro-1-(3-fluoro-4-n-pentyloxyphenyl)-2-isopropoxyimino-2-methoxyethane 1-chloro-1-(3-pentyl-5-di-n-propylaminophenyl)-2-methoxyimino-2-methoxyethane 1-bromo-2-methoxyimino-2-methoxyethane 1-bromo-2-ethoxyimino-2-methoxyethane 1-bromo-2-methoxyimino-2-ethoxyethane 1-bromo-1-phenyl-2-methoxyimino-2-methoxyethane 1-bromo-1-(4-chlorophenyl)-2-methoxyimino-2-methoxyethane As mentioned before the compounds of this invention are useful as intermediates for preparing a variety of valuable pesticidal compounds. More particularly, the compounds of this invention are useful for preparing insecticidal and acaricidal phosphorus esters of the formula:

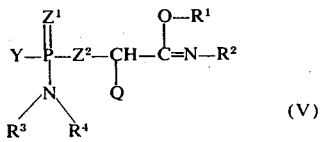

(V)

wherein Y is an aliphatic or aromatic group; $R^3$ and $R^4$ are hydrogen or alkyl; $Z^1$ and $Z^2$ are oxygen or sulfur; and $R^1$, $R^2$ and Q are the same substituents as heretofore defined for the compounds of the present invention. These valuable insecticidal and acaricidal compounds are prepared by reacting the compounds of the present invention with an alkali metal phosphoramidate or phosphonamidate having the desired substituents on the phosphorous and nitrogen atoms. This reaction can be effected by heating the reactants in an inert organic solvent, such as methyl ethyl ketone, at the reflux temperature of the reaction mixture for a period of from about 4 to about 24 hours. After the reaction is completed the reaction mixture can be filtered to remove the alkali metal halide which has formed. The desired product can then be conveniently recovered as a residue upon evaporation of the solvent from the remaining solution. The product can then be used as such or can be further purified by washing, distillation or chromatography if the product is an oil, or by trituration, recrystallization or other common methods well known in the art if the product is a solid.

The alkali metal phosphonamidates and phosphoramidates which can be used in the preparation of the pesticidal compounds can be prepared by the methods described by Malatesta and Pizzotti, Chimica e Industria (Milan) 27, 6–10 (1945), and Melnikov and Grapov, Zhur. Vsesoyuz Khim. Obshchestva in D. I. Mendeleeva, 6, No. 1; 119–120(1961).

Exemplary of suitable salts are:

potassium O-methyl N,N-dimethylphosphoramidate
potassium O-ethyl N-methylphosphoramidate
potassium O-methyl N-isopropylphosphoramidate
potassium O-n-propyl N,N-diethylphosphoramidate
potassium O-n-pentyl N-n-butylphosphoramidate
potassium O-ethyl N-isopropylphosphoramidate
potassium O-phenyl N,N-dimethylphosphoramidate
potassium O-(4-methylphenyl) N-n-propylphosphoramidate
potassium O-(3-chlorophenyl) N-methyl-N-ethylphosphoramidate
potassium O-(4-bromophenyl) N,N-di-n-butylphosphoramidate
potassium O-(4-methoxyphenyl) N,N-dimethylphosphoramidate
potassium O-(2-chloro-4-nitrophenyl) N-isopropylphosphoramidate
potassium O-(3-methylthiophenyl) N-t-butylphosphoramidate
potassium O-(4-methylsulfinylphenyl) N-methylphosphoramidate
potassium O-(4-dimethylaminophenyl) N-ethylphosphoramidate
potassium O-(3-ethylsulfonylphenyl) N,N-di-n-decylphosphoramidate
potassium S-methyl N-isopropyl(thiolo)phosphoramidate
potassium S-n-propyl N,N-dimethylthiolophosphoramidate
potassium S-(2,4-dichlorophenyl) N-methylthiolophosphoramidate
potassium S-(2,4,6-tribromophenyl) N-sec-butylthiolophosphoramidate
potassium O-(3-bromo-4-chlorophenyl) N-isopropylthiolophosphoramidate
potassium O-ethyl N,N-dimethylthiolophosphoramidate
potassium O-phenyl N-t-butylthiolophosphoramidate
potassium S-ethyl N-ethyldithiolophosphoramidate
potassium S-allyl N,N-dimethyldithiolophosphoramidate
potassium S-benzyl N,N-dimethyldithiolophosphoramidate
potassium S-(3,4-dibromophenyl) N-isopropyldithiolophosphoramidate
potassium O-ethyl N,N-diethylthionophosphoramidate
potassium O-n-butyl N,N-dimethylthionophosphoramidate
potassium O-(2,5-dimethylphenyl) N-hexylthionophosphoramidate
potassium S-ethyl N-isopropylthiolothionophosphoramidate
potassium S-phenyl N-t-butylthiolothionophosphoramidate
potassium S-benzyl N-n-butylthiolothionophosphoramidate potassium O-methyl N,N-dimethylthiolothionophosphoramidate
potassium O-(4-methoxyphenyl) N-ethylthiolothionophosphoramidate
potassium O-(3-dimethylaminophenyl) N,N-dimethylthiolothionophosphoramidate
potassium S-methyl N,N-diethyldithiolothionophosphoramidate
potassium S-(2-chloro-4-methylphenyl) N-isopropyldithiolothionophosphoramidate
potassium S-(3,4-dichlorobenzyl) N-n-butyldithiolothionophosphoramidate
potassium methyl-N,N-dimethylphosphonamidate
potassium isopropyl-N-n-butylphosphonamidate
potassium 4-chlorophenyl-N-isopropylphosphonamidate
potassium 2-methoxy-4-bromophenyl-N,N-diethylphosphonamidate
potassium ethyl-N-t-butylthionophosphonamidate The following examples illustrate the manner in which the new compounds of the present invention can be used to prepare valuable pesticidal compounds.

EXAMPLE 20

Preparation of S-(2-Methoxyimino-2-methoxyethyl) O-ethyl N-isopropylthiolophosphoramidate A solution of 1-chloro-2-methoxyimino-2-methoxyethane (7 grams; 0.05 mol) in methyl ethyl ketone (100 ml) was placed in a glass reaction flask equipped with mechanical stirrer and reflux condenser. Potassium O-ethyl N-isopropylthiolophosphoramidate (11 grams; 0.05 mol) was added thereto and the reaction mixture was heated at reflux for a period of about 21 hours with continuous stirring. After this time the reaction mixture was cooled and filtered to remove the potassium chloride which had formed. The filtered solution was then stripped of solvent in a rotary evaporator and the resulting product was chromatographed in a 37 inch long column of 1 inch diameter utilizing florex (300 grams) as the adsorbent and pentane-ether mixtures and acetone as the eluants. Thirty-one fractions were collected of which the first two were discarded. Eluates 3 to 30, which were eluted with pentane-ether mixtures, were combined and evaporated and eluate 31, which was eluted with acetone, was evaporated to yield S-(2-methoxyimino-2-methoxyethyl) O-ethyl N-isopropylthiolophosphoramidate. The product of eluate 31 had a refractive index of 1.4902 at 25°C and the following elemental analysis as calculated for $C_9H_{21}N_2O_4PS$:

|  | N | P | S |
|---|---|---|---|
| Theoretical % | 9.9 | 10.9 | 11.3 |
| Found % | 9.68 | 10.54 | 11.13 |

EXAMPLE 21

Preparation of S-(2-Methoxyimino-2-ethoxyethyl) O-Ethyl N-Isopropylthiolophosphoramidate 1-Chloro-2-methoxyimino-2-ethoxyethane (4.5 grams; 0.03 mol), potassium O-ethyl N-isopropylthiolophosphoramidate (6.5 grams; 0.03 mol) and methyl ethyl ketone (100 ml) were charged into a glass reaction flask equipped with stirrer and reflux condenser. The reaction mixture was heated at reflux for a period of about 16 hours with continuous stirring. After this time the reaction mixture was cooled and filtered to remove the potassium chloride which had formed. The filtered solution was then evaporated under reduced pressure and the residue dissolved in an ether-methylene chloride mixture. The resulting solution was washed with water and was dried over anhydrous magnesium sulfate and filtered. The filtered solution was then stripped of solvents under reduced pressure to yield S-(2-methoxyimino-2-ethoxyethyl) O-ethyl N-isopropylthiolophosphoramidate having a refractive index of 1.4790 at 23°C and having the following elemental analysis as calculated for $C_{10}H_{23}N_2O_4PS$:

|  | C | H | P | S |
|---|---|---|---|---|
| Theoretical % | 40.3 | 7.8 | 10.4 | 10.7 |
| Found % | 39.99 | 7.69 | 10.72 | 10.77 |

EXAMPLE 22

Preparation of O-(2-Methoxyimino-2-methoxyethyl) O-Methyl N,N-Dimethylphosphoramidate A solution of 1-chloro-2-methoxyimino-2-methoxyethane (7 grams; 0.05 mol) in methyl ethyl ketone (100 ml) is placed into a glass reaction flask equipped with a mechanical stirrer and reflux condenser. Potassium O-methyl N,N-dimethylphosphoramidate (8.9 grams; 0.05 mol) is added and the reaction mixture is heated at reflux with stirring, for a period of about 18 hours. After this time the reaction mixture is cooled and filtered to remove the potassium chloride which is formed. The filtered solution is then stripped of solvent under reduced pressure and the residue is redissolved in an ether-methylene chloride mixture. The resulting solution is washed with water and dried over anhydrous magnesium sulfate. The dried solution is then filtered and evaporated to yield O-(2-methoxyimino-2-methoxyethyl) O-methyl N,N-dimethylphosphoramidate.

EXAMPLE 23

Preparation of O-(2-n-Butoxyimino-2-ethoxyethyl) O-(4-Chlorophenyl) N,N-Diethylphosphoramidate A solution of 1-chloro-2-n-butoxyimino-2-ethoxy ethane (9.7 grams; 0.05 mol) in methyl ethyl ketone (100 ml) is placed into a glass reaction flask equipped with a mechanical stirrer and reflux condenser. Potassium O-(4-chlorophenyl) N,N-diethylphosphoramide (15 grams; 0.05 mol) is added and the reaction mixture is heated at reflux, with stirring, for a period of about 18 hours. After this time the reaction mixture is cooled and filtered to remove the potassium chloride which has formed. The filtered solution is then stripped of solvent under reduced pressure and the residue is redissolved in an ether-methylene chloride mixture. The resulting solution is washed with water and is dried over anhydrous magnesium sulfate. The dried solution is then filtered and evaporated to yield O-(2-n-butoxyimino-2-ethoxyethyl) O-(4-chlorophenyl) N,N-diethylphosphoramidate.

For practical use as insecticides and acaricides the compounds of Formula V are generally incorporated into insecticidal and acaricidal compositions which comprise an inert carrier and an insecticidally and acaricidally toxic amount of such a compound. Such compositions, which can also be called formulations, enable the active compound to be applied conveniently to the site of the pest infestation in any desired quantity. These compositions can be solids such as dusts, granules or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides or acaricides can be dispersed under superatmospheric pressure as aerosols. However, preferred liquid insecticidal and acaricidal compositions are emulsifiable concentrates, which comprise an active compound and as the inert carrier, a solvent and an emulsifier. Such emulsifiable concentrates can be extended with water and/or oil to any desired concentration of active compound for application as sprays to the site of the insect and acarid infestation. The emulsifiers most commonly used in these concentrates are nonionic or mixtures of nonionic with anionic surface-active agents.

A typical insecticidal and acaricidal composition is illustrated by the following example, in which the quantities are in parts by weight.

EXAMPLE 24

Preparation of a Dust

| | |
|---|---|
| Product of Example 20 | 10 |
| Powdered talc | 90 |

The above ingredients are mixed in a mechanical grinder-blender and are ground until a homogeneous, free-flowing dust of the desired particle size is obtained. This dust is suitable for direct application to the site of the insect infestation.

The compounds of Formula V can be applied as insecticides and acaricides in a manner recognized by the art. One method for destroying insects and acarids comprises applying to the locus of the insect or acarid infestation, an insecticidal and acaricidal composition comprising an inert carrier and as the essential active ingredient, in a quantity which is toxic to insects and acarids, pesticidally active compound. The concentration of the pesticidal compounds in these compositions will vary greatly with the type of formulation and the purpose for which it is designed, but generally the compositions will comprise from about 0.05 to about 95 percent by weight of the active compounds of this invention.

The insecticidal activity of the compounds of Formula V was demonstrated by experiments carried out for the control of a variety of insects.

In one experiment, designated as the housefly knockdown test, fifty three day old unsexed adult houseflies (*Musca Domestica*) were anesthetized with carbon dioxide gas and placed into a fine mesh wire cage. The flies were allowed to recover completely from the effects of the carbon dioxide gas and were then sprayed with a formulation containing the indicated concentration of test compound. After 30 minutes the knockdown value of the test compound was determined. Knockdown is considered as an individual fly that is unable to move its body length, and the knockdown value is given as a percent of down flies based upon the number of down flies in comparison to a control. The results of this experiment are shown in Table I.

In another experiment carried out for the control of the housefly, designated as the housefly topical test, each of fifty flies was contacted with a test compound by applying 1 ml of test formulation, containing the indicated concentrations of active compound, to the dorsum of its thorax. The flies were then placed in a wire mesh cage where they were supplied with sugar syrup. At the end of a 24 hour period the mortality of the flies was observed and rated in comparison to a control. The results of this experiment are also shown in Table I.

Table I

| | | % Control | |
|---|---|---|---|
| Test Compound | Concentration of Test Compound in ppm | Housefly Knockdown Test | Housefly Topical Test |
| Product of Example 20 | 3500 | 100 | 100 |
| -do- | 1000 | 100 | 100 |
| -do- | 100 | — | 100 |
| -do- | 10 | — | 80 |
| Product of Example 21 | 3500 | 96 | 100 |
| -do- | 1000 | 94 | 100 |
| -do- | 100 | — | 100 |

The insecticidal activity of the compounds of Formula V was further illustrated in experiments carried out for the control of the pea aphid (*Acyrthosiphon pisum*) by contact. In these experiments ten day old Laxton pea plants contained in small plastic pots were each infested with ten adult pea aphids. The plants and pea aphids were then sprayed with the test compound formulated as an aqueous emulsion of an acetone solution at various concentrations. The infested plants were then placed in a holding chamber maintained at a constant temperature for a period of 48 hours. After this time the mortality of the aphids was determined and rated on a percent basis in comparison to a control. The results of this experiment are shown in Table II.

Table II

| Test Compound | Concentration of Test Compound in ppm | % Control of Pea Aphids Contact Test |
|---|---|---|
| Product of Example 20 | 3500 | 100 |
| -do- | 1000 | 100 |
| -do- | 100 | 100 |
| -do- | 10 | 100 |
| Product of Example 21 | 3500 | 100 |
| -do- | 1000 | 100 |
| -do- | 100 | 100 |
| -do- | 10 | 89 |

The systemic activity of the compounds of Formula III was demonstrated in experiments for the systemic control of pea aphids. In these experiments 5 day old Laxton pea plants which had previously been watered with 30 ml of water containing the test compound at the indicated concentration, was infested with ten newly molted adult pea aphids. The infested plants were then placed in a holding chamber at 65°F for a period of 48 hours where they were supplied with water and light as required. After this time the mortality of the pea aphids was determined and rated on a percent basis in comparison to an untreated control. The results of this experiment are given in Table III.

Table III

| Test Compound | Concentration of Test Compound in ppm | % Control of Pea Aphids |
| --- | --- | --- |
| Product of Example 20 | 100 | 100 |
| -do- | 80 | 100 |
| -do- | 40 | 100 |
| -do- | 20 | 100 |
| Product of Example 21 | 100 | 100 |
| -do- | 80 | 100 |
| -do- | 40 | 88 |
| -do- | 20 | 62 |

The acaricidal activity of the compounds of Formula V was demonstrated in experiments carried out for the control of the two-spotted spider mite (*Tetranychus urticae*).

In one experiment wherein the activity of the compounds of Formula V as contact poisons was determined, the test compounds were formulated at the indicated dosages, as aqueous emulsions of acetone solutions and were sprayed onto Henderson bush lima bean plants, each infested with about 100 adult two-spotted spider mites. The treated plants were then placed into a holding room and were supplied with their daily requirement of water and light. After a period of 5 days the mortality of the mites is determined and is rated on a percentage basis in comparison to untreated controls. The results of this experiment are shown in Table IV.

Table IV

| Test Compound | Concentration of Test Compound in ppm | % Mortality |
| --- | --- | --- |
| Product of Example 20 | 3500 | 100 |
| -do- | 1000 | 100 |
| -do- | 100 | 100 |
| -do- | 10 | 100 |
| Product of Example 21 | 3500 | 100 |
| -do- | 1000 | 100 |
| -do- | 100 | 100 |
| -do- | 10 | 80 |

In another experiment the systemic activity of the compounds of the invention, for the control of the two-spotted spider mite, was demonstrated. In this experiment 5 day old Henderson bush lima bean plants were each watered with 30 ml of a formulation containing the test compound at the indicated concentration. After a period of 48 hours the plants were infested with two-spotted spider mites and were placed into a holding room and supplied with water and light as required. After a period of 5 days the mortality of the mites is determined and rated on a percent basis in comparison to untreated controls. The results of this experiment are shown in Table V.

Table V

| Test Compound | Concentration of Test Compound in ppm | % Mortality |
| --- | --- | --- |
| Product of Example 20 | 100 | 100 |
| -do- | 80 | 100 |
| -do- | 40 | 100 |
| -do- | 20 | 100 |
| Product of Example 21 | 100 | 100 |
| -do- | 80 | 100 |
| -do- | 40 | 100 |
| -do- | 20 | 100 |

We claim:
1. A compound of the formula

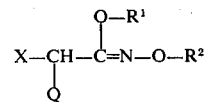

where X is selected from the group consisting of chlorine and bromine; $R^1$ and $R^2$ are alkyl of up to 10 carbon atoms; and Q is selected from the group consisting of hydrogen, lower alkyl, lower alkenyl, lower alkoxy, lower alkylthio and

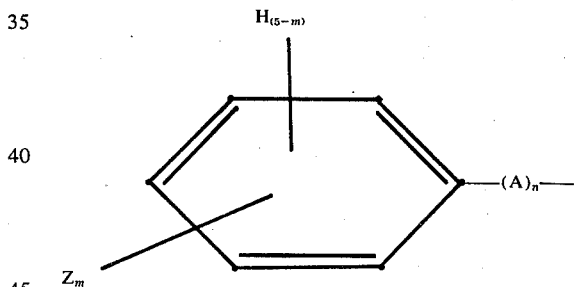

wherein Z is selected from the group consisting of lower alkyl, lower alkoxy, chlorine, bromine and nitro; $m$ is an integer from 0 to 3; A is methylene and $n$ is an integer from 0 to 1.

2. The compound of claim 1, 1-chloro-2-methoxyimino-2-methoxyethane.

3. The compound of claim 1, 1-chloro-2-ethoxyimino-2-methoxyethane.

4. The compound of claim 1, 1-chloro-2-methoxyimino-2-ethoxyethane.

5. The compound of claim 1, 1-chloro-1-phenyl-2-methoxyimino-2-methoxyethane.

6. The compound of claim 1, 1-chloro-2-ethoxyimino-2-ethoxyethane.

* * * * *